(12) United States Patent
Wolters et al.

(10) Patent No.: US 9,975,685 B2
(45) Date of Patent: May 22, 2018

(54) PACKAGING CONTAINER MADE OF A SHEET-LIKE COMPOSITE WITH IMPROVED ADHESION-LAYER AND INNER-LAYER COMBINATION

(75) Inventors: Michael Wolters, Heinsburg (DE); Günther Lorenz, Übach-Palenberg (DE); Holger Schmidt, Inden-Lamersdorf (DE); Jörg Bischoff, Hückelhoven (DE)

(73) Assignee: SIG TECHNOLOGY AG, Neuhausen (CH)

(*) Notice: Subject to any disclaimer, the term of this patent is extended or adjusted under 35 U.S.C. 154(b) by 720 days.

(21) Appl. No.: 13/814,390

(22) PCT Filed: Aug. 4, 2011

(86) PCT No.: PCT/EP2011/003913
§ 371 (c)(1),
(2), (4) Date: Apr. 22, 2013

(87) PCT Pub. No.: WO2012/016701
PCT Pub. Date: Feb. 9, 2012

(65) Prior Publication Data
US 2013/0213962 A1    Aug. 22, 2013

(30) Foreign Application Priority Data
Aug. 5, 2010  (DE) .................. 10 2010 033 466

(51) Int. Cl.
*B65D 81/34* (2006.01)
*B29D 22/00* (2006.01)
(Continued)

(52) U.S. Cl.
CPC ............ *B65D 81/34* (2013.01); *B29D 22/003* (2013.01); *B32B 15/08* (2013.01); *B32B 15/20* (2013.01);
(Continued)

(58) Field of Classification Search
CPC . B32B 2317/12; B32B 2553/00; B32B 27/10; B32B 29/00; B32B 2307/746;
(Continued)

(56) References Cited

U.S. PATENT DOCUMENTS 4,894,267 A    1/1990  Bettle, III et al.
5,725,917 A *  3/1998  Parks ................. B32B 23/08
                                                229/5.84
(Continued)

FOREIGN PATENT DOCUMENTS

DE    60033554 T2    5/2007
EP    0 575 703 A1   12/1993
(Continued)

OTHER PUBLICATIONS

Related copending U.S. Appl. No. 13/814,361, filed Apr. 16, 2013 (and its prosecution history).
(Continued)

*Primary Examiner* — Yan Lan
(74) *Attorney, Agent, or Firm* — Meunier Carlin & Curfman LLC

(57) ABSTRACT

The present invention relates to a container that delimits a container interior from the surroundings and that is formed at least in part from a sheet-like composite.

22 Claims, 8 Drawing Sheets

Figure 1:
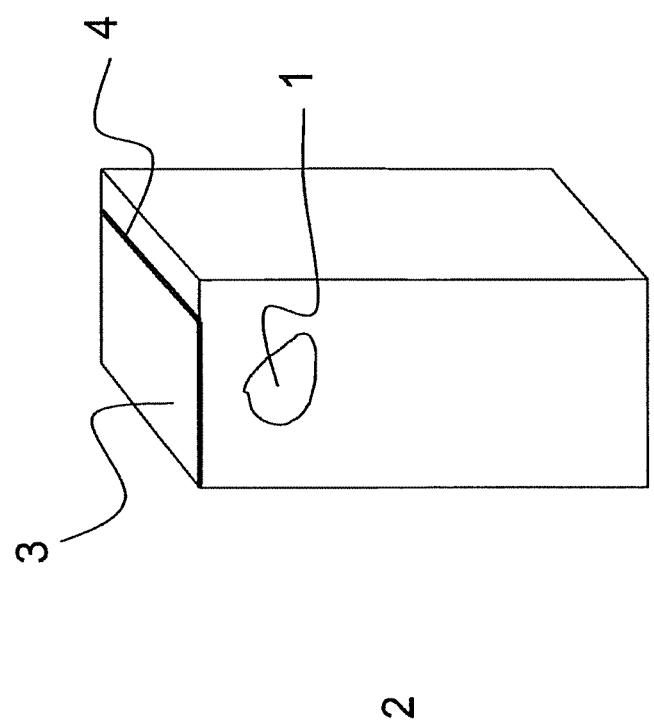

(51) Int. Cl.
| | |
|---|---|
| *B65D 5/06* | (2006.01) |
| *B65D 5/74* | (2006.01) |
| *B32B 15/08* | (2006.01) |
| *B32B 15/20* | (2006.01) |
| *B32B 27/08* | (2006.01) |
| *B32B 27/10* | (2006.01) |
| *B32B 27/34* | (2006.01) |
| *B32B 29/00* | (2006.01) |
| *B32B 7/12* | (2006.01) |
| *B32B 27/32* | (2006.01) |

(52) U.S. Cl.
CPC ............. *B32B 27/08* (2013.01); *B32B 27/10* (2013.01); *B32B 27/322* (2013.01); *B32B 27/327* (2013.01); *B32B 27/34* (2013.01); *B32B 29/002* (2013.01); *B65D 5/065* (2013.01); *B65D 5/747* (2013.01); *B32B 7/12* (2013.01); *B32B 27/32* (2013.01); *B32B 2255/10* (2013.01); *B32B 2255/205* (2013.01); *B32B 2264/101* (2013.01); *B32B 2264/102* (2013.01); *B32B 2264/104* (2013.01); *B32B 2307/516* (2013.01); *B32B 2307/554* (2013.01); *B32B 2307/72* (2013.01); *B32B 2307/7244* (2013.01); *B32B 2307/732* (2013.01); *B32B 2307/746* (2013.01); *B32B 2307/75* (2013.01); *B32B 2439/00* (2013.01); *B32B 2439/70* (2013.01)

(58) Field of Classification Search
CPC ............ B32B 2307/75; B32B 2439/00; B32B 2439/70; B32B 27/08; B32B 27/32; B32B 27/322; B32B 27/327; B32B 27/34; B32B 29/002; B32B 7/12; B32B 15/08; B32B 15/20; B32B 2255/10; B32B 2255/205; B32B 2264/101; B32B 2264/102; B32B 2264/104; B32B 2307/516; B32B 2307/554; B32B 2307/72; B32B 2307/7244; B65D 5/065; B65D 5/747; B65D 81/34; B29D 22/003
USPC .............................................. 428/35.7, 34.1
See application file for complete search history.

(56) References Cited

U.S. PATENT DOCUMENTS

| | | | |
|---|---|---|---|
| 6,279,779 B1 | 8/2001 | Laciacera et al. | |
| 6,872,459 B1 * | 3/2005 | Frisk | B32B 27/08 |
| | | | 428/474.4 |
| 2005/0175800 A1 | 8/2005 | Staffetti et al. | |
| 2008/0299403 A1 * | 12/2008 | Shearer | B32B 27/08 |
| | | | 428/479.6 |

FOREIGN PATENT DOCUMENTS

| | | | |
|---|---|---|---|
| EP | 1059162 | A2 | 12/2000 |
| EP | 1 507 660 | A | 2/2005 |
| EP | 1 507 661 | A | 2/2005 |
| EP | 1 570 660 | A | 9/2005 |
| EP | 1 570 661 | A | 9/2005 |
| WO | 90/09926 | A2 | 9/1990 |
| WO | 98/14317 | A1 | 4/1998 |
| WO | 98/26994 | A1 | 6/1998 |
| WO | 03/095199 | A1 | 11/2003 |
| WO | 03/095200 | A1 | 11/2003 |
| WO | WO03/095200 | * | 11/2003 |
| WO | 2004/089628 | A1 | 10/2004 |
| WO | 2009/112255 | A1 | 9/2009 |
| WO | 2010/023859 | A1 | 3/2010 |
| WO | 2012/016701 | | 2/2012 |
| WO | 2012/016702 | | 2/2012 |
| WO | 2012/016705 | | 2/2012 |

OTHER PUBLICATIONS

Related copending U.S. Appl. No. 13/814,387, filed Apr. 15, 2013 (and its prosecution history).
International Preliminary Report on Patentability, dated Feb. 5, 2013, in International Application No. PCT/EP2011/003913. (English Translation).
Written Opinion, dated Feb. 5, 2013, in International Application No. PCT/EP2011/003913. (English Translation).
International Preliminary Report on Patentability, dated Feb. 5, 2013, in International Application No. PCT/EP2011/003914. (English Translation).
Written Opinion, dated Feb. 5, 2013, in International Application No. PCT/EP2011/003914. (English Translation).
International Preliminary Report on Patentability, dated Feb. 5, 2013, in International Application No. PCT/EP2011/003922. (English Translation).
Written Opinion, dated Feb. 5, 2013, in International Application No. PCT/EP2011/003922. (English Translation).
International Patent Application No. PCT/EP2011/003913, International Search Report dated Oct. 26, 2011 (1 page).
International Patent Application No. PCT/EP2011/003914, International Search Report dated Dec. 15, 2011 (2 pages).
International Patent Application No. PCT/EP2011/003922, International Search Report dated Dec. 15, 2011 (1 page).

* cited by examiner

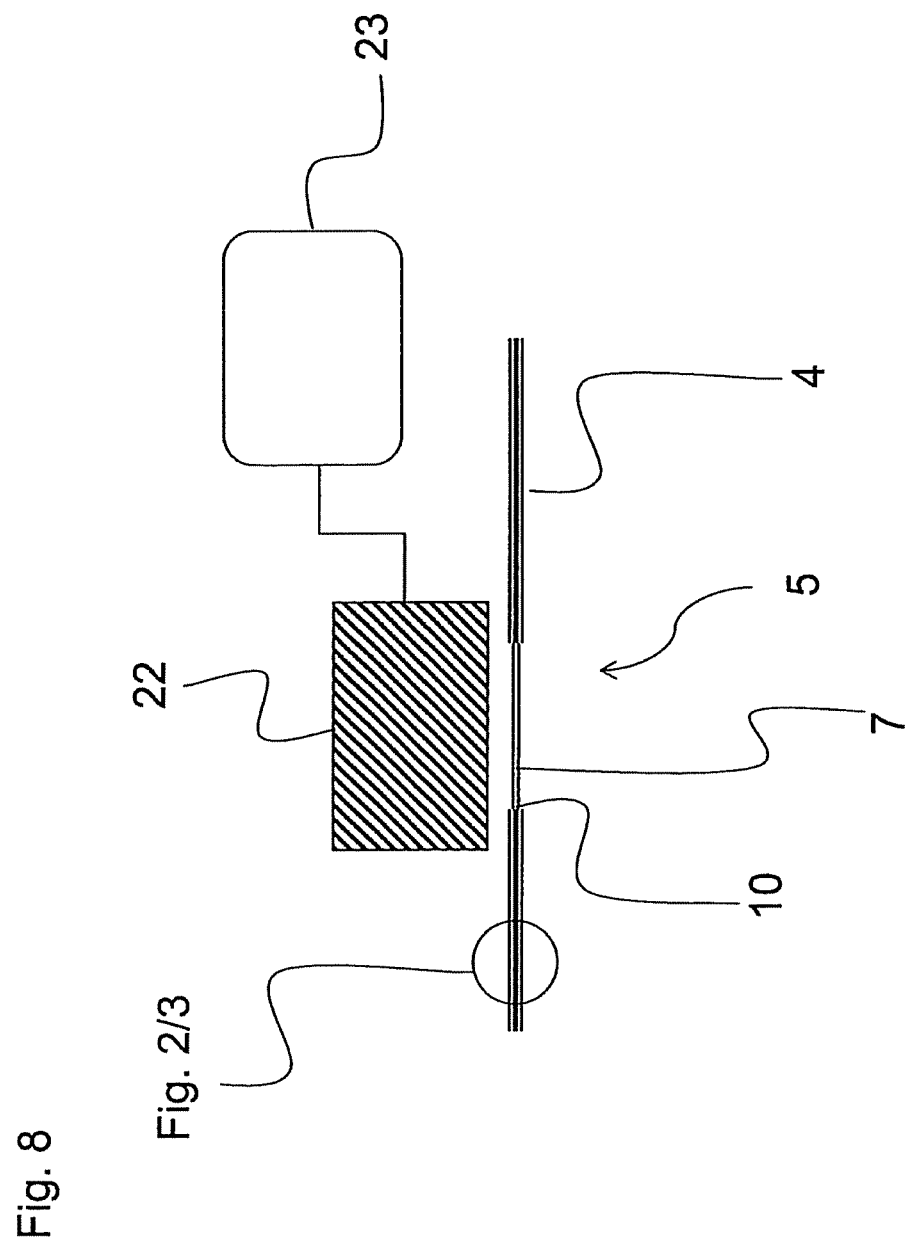

PACKAGING CONTAINER MADE OF A SHEET-LIKE COMPOSITE WITH IMPROVED ADHESION-LAYER AND INNER-LAYER COMBINATION

The present invention relates generally to a container which delimits a container interior from the surroundings and which is formed at least in part from a sheet-like composite, wherein the sheet-like composite comprises as composite constituents at least:
- a polymer outer layer facing the surroundings;
- a carrier layer following the polymer outer layer in the direction of the container interior;
- a barrier layer following the carrier layer in the direction of the container interior;
- an adhesive layer following the barrier layer in the direction of the container interior;
- a polymer inner layer following the adhesive layer in the direction of the container interior, a process for the production of a sheet-like composite and a process for the production of a container.

For a long time foodstuffs, whether foodstuffs for human consumption or also animal feed products, have been preserved by being stored either in a can or in a glass jar closed with a lid. The shelf life can be increased here, for example, by sterilizing as far as possible in each case the foodstuff and the container, here the glass jar or can, separately and then filling the container with the foodstuff and closing it. However, this measure, which in itself has been proven for a long time, for increasing the shelf life of foodstuffs, has a number of disadvantages, for example a downstream sterilization which is again necessary.

Because of their essentially cylindrical shape, cans and glass jars have the disadvantage that very dense and space-saving storage is not possible. Furthermore, cans and glass jars have a considerable intrinsic weight, which leads to an increased consumption of energy during transportation. A quite high consumption of energy is moreover necessary for the production of glass, tinplate or aluminium, even if the raw materials used for this originate from recycling. In the case of glass jars, an increased outlay on transportation is an additional difficulty, since these are usually prefabricated in a glassworks and must then be transported to the foodstuffs filling plant utilizing considerable transportation volumes. Glass jars and cans moreover can be opened only with a considerable application of force or with the aid of tools, and therefore rather inconveniently. In the case of cans, there is also a high risk of injury from sharp edges which arise during opening. In the case of glass jars, glass splinters are forever entering into the foodstuff during filling or opening of filled glass jars, which in the worst case can lead to internal injuries on consumption of the foodstuff.

Other packaging systems for storing foodstuffs for a long period of time as far as possible without impairment are known from the prior art. These are containers produced from sheet-like composites—often also called laminate. Such sheet-like composites are often built up from a layer of thermoplastic, a carrier layer usually made of cardboard or paper, an adhesion promoter layer, an aluminium layer and a further layer of plastic, as disclosed, inter alia, in WO 90/09926 A2.

These laminated containers already have many advantages over the conventional glass jars and cans. Nevertheless, possibilities for improvement also exist for these packaging systems.

Thus, in regions of the sheet-like composites which are exposed to high mechanical stresses during production of the container, small defects are forever being formed, such as cracks, blisters, delamination regions or unsealed pockets or microchannels up to leaks, in which germs can deposit themselves into the container, and the foodstuff in the container can decay more easily. These germs in small defects of the containers cannot be counteracted even by a more intensive sterilization of the foodstuffs. Even the attempt at more intensive sterilization of the container before filling with the foodstuff scarcely leads to the desired long shelf life of the foodstuff. Any damage to an aluminium barrier layer furthermore leads to trouble spots in respect of entry of oxygen into the container, which in turn contributes towards losses in the quality of the foodstuff and therefore towards a shortened shelf life. Regions during production of the container which have scored crosses and are folded particularly sharply or in several dimensions, for example in the corners of the base and top region of the containers, are particularly at risk.

Generally, the object of present invention is to at least partly eliminate the disadvantages emerging from the prior art.

An object according to the invention furthermore consists of obtaining a high resistance to stress corrosion cracking coupled with at least equally good opening and sealing properties and an impermeability to oxygen, in particular along the sealing seams, such as the longitudinal seam, of a container, with a low use of materials and simple high-speed production. This applies in particular if foodstuffs having a high fat content, which is often present as separated fat, such as fat globules, have to be stored for a long time at room temperature or even higher temperatures if the storage and refrigeration chain is interrupted. In connection with the opening properties, the formation of threads of plastic is to be avoided in particular. Such threads are observed, for example, during opening of perforations. In the case of liquid-containing container fillings in particular, this often leads to an undesirable sticking of the liquids to these threads, which leads to imprecise pouring out with after-running. Threads spanning the opening in the form of bars can moreover lead to the foodstuff being backed up by these.

A contribution towards achieving at least one of the abovementioned objects is made by the subject matter of the classifying claims. The subject matter of the sub-claims which are dependent upon the classifying claims represents preferred embodiments of this contribution towards achieving the objects.

A contribution towards achieving the above objects is made by a container which delimits a container interior from the surroundings and which is formed at least in part from a sheet-like composite, wherein the sheet-like composite comprises at composite constituents at least:
- a polymer outer layer facing the surroundings;
- a carrier layer following the polymer outer layer in the direction of the container interior;
- a barrier layer following the carrier layer in the direction of the container interior;
- an adhesive layer following the barrier layer in the direction of the container interior;
- a polymer inner layer following the adhesive layer in the direction of the container interior;

wherein the layer thickness of the adhesive layer $LT_{AL}$ is greater than the layer thickness of the polymer inner layer $LT_{PIL}$.

In connection with the container according to the invention, it is preferable for the layer thickness of the adhesive layer to be greater than the sum of all the layer thicknesses of the composite layers lying between the adhesive layer and container interior. This applies both in the case where only one polymer inner layer follows the adhesive layer and also if two, three or more layers, usually also including the polymer inner layer, follow the adhesive layer in the direction of the container interior.

The wording "further layer Y following a layer X in the direction of the container interior" as used above is intended to convey that the layer Y is closer to the interior than the layer X. This wording does not necessarily say that the layer Y follows the layer X directly, but rather also includes a constellation in which one or more further layers are located between the layer X and the layer Y. According to a particular embodiment, however, the sheet-like composite is characterized in that at least the carrier layer follows the polymer outer layer directly, the adhesive layer follows the barrier layer directly and the polymer inner layer follows the adhesive layer directly.

The container according to the invention preferably has at least one, preferably between 6 and 16 edges, particularly preferably between 7 and 12 or even more edges. According to the invention, edge is understood as meaning in particular regions which, on folding of a surface, are formed by two parts of this surface lying over one another. Edges which may be mentioned by way of example are the elongated contact regions of in each case two wall surfaces of a container essentially in the shape of a rectangular parallelepiped. Such a container in the shape of a rectangular parallelepiped as a rule has 12 edges. In the container, the container walls preferably represent the surfaces of the container framed by the edges. The container walls of a container according to the invention are preferably formed to the extent of at least 50%, preferably to the extent of at least 70% and moreover preferably to the extent of at least 90% of their surface from a carrier layer as part of the sheet-like composite.

Thermoplastics in particular are possible as the polymer outer layer, which conventionally has a layer thickness in a range of from 5 to 25 µm, particularly preferably in a range of from 8 to 20 µm and most preferably in a range of from 10 to 18 µm. Thermoplastics which are preferred in this connection are, in particular, those having a melting temperature in a range of from 80 to 155° C., preferably in a range of from 90 to 145° C. and particularly preferably in a range of from 95 to 135° C.

In addition to the thermoplastic polymer, the polymer outer layer can optionally also comprise an inorganic filler. All the preferably particulate solids which appear to be suitable to the person skilled in the art and which, inter alia, lead to an improved distribution of heat in the plastic and therefore to a better sealability of the plastic are possible as the inorganic filler. Preferably, the average particle sizes (d50%) of the inorganic solids, determined by sieve analysis, are in a range of from 0.1 to 10 µm, preferably in a range of from 0.5 to 5 µm and particularly preferably in a range of from 1 to 3 µm. Possible inorganic solids are, preferably, metal salts or oxides of di- to tetravalent metals. Examples which may be mentioned here are the sulphates or carbonates of calcium, barium or magnesium or titanium dioxide, preferably calcium carbonate.

In this connection, however, it is preferable for the polymer outer layer to comprise a thermoplastic polymer to the extent of at least 60 vol. %, preferably at least 80 vol. % and particularly preferably at least 95 vol. %, in each case based on the polymer outer layer.

Suitable thermoplastic polymers of the polymer outer layer are polymers obtained by chain polymerization, in particular polyolefins, among these cyclic olefin copolymers (COC), polycyclic olefin copolymers (POC), in particular polyethylene and polypropylene, being preferred and polyethylene being particularly preferred. The melt flow rates (MFR), determined by means of DIN 1133 (190° C./2.16 kg), of the thermoplastic polymers, which can also be employed as mixtures of at least two, are preferably in a range of from 1 to 25 g/10 min, preferably in a range of from 2 to 9 g/10 min and particularly preferably in a range of from 3.5 to 8 g/10 min.

Among the polyethylenes, HDPE, MDPE, LDPE, LLDPE and PE and mixtures of at least two of these are preferred for the process according to the invention. The MFR, determined by means of DIN 1133 (190° C./2.16 kg), of these polymers are preferably in a range of from 3 to 15 g/10 min, preferably in a range of from 3 to 9 g/10 min and particularly preferably in a range of from 3.5 to 8 g/10 min. In connection with the polymer outer layer, it is preferable to employ polyethylenes having a density (according to ISO 1183-1: 2004) in a range of from 0.900 to 0.960 g/cm$^3$, preferably in a range of from 0.912 to 0.950 g/cm$^3$, an MFR in a range of from 2.5 to 8 g/10 min and a melting temperature (according to ISO 11357) in a range of from 96 to 135° C.

A further layer or further layers may also optionally be provided on the side of the polymer outer layer facing the surroundings. In particular, a printed layer may also be applied on the side of the polymer outer layer facing the surroundings.

As the carrier layer following the polymer outer layer in the direction of the container interior, any material which is suitable for this purpose to the person skilled in the art and which has an adequate strength and rigidity to give the container stability to the extent that in the filled state the container essentially retains its shape can be employed. In addition to a number of plastics, plant-based fibrous substances, in particular celluloses, preferably sized, bleached and/or non-bleached celluloses, are preferred, paper and cardboard being particularly preferred. The weight per unit area of the carrier layer is preferably in a range of from 140 to 450 g/m$^2$, particularly preferably in a range of from 160 to 400 g/m$^2$ and most preferably in a range of from 170 to 350 g/m$^2$.

As the barrier layer following the carrier layer in the direction of the container interior, any material which is suitable for this purpose to the person skilled in the art and has an adequate barrier action, in particular against oxygen, can be employed. The barrier layer can be a metal foil, such as, for example, an aluminium foil, a metallized film or a barrier layer of plastic.

In the case of a barrier layer of plastic, this preferably comprises at least 70 wt. %, particularly preferably at least 80 wt. % and most preferably at least 95 wt. % of at least one plastic which is known to the person skilled in the art for this purpose, in particular because of aroma or gas barrier properties which are suitable for packaging containers. Preferably, thermoplastics are employed here. In the container according to the invention, it may prove advantageous if the barrier layer of plastic has a melting temperature (according to ISO 11357) in a range of from more than 155 to 300° C., preferably in a range of from 160 to 280° C. and particularly preferably in a range of from 170 to 270° C. Possible plastics, in particular thermoplastics, here are plastics carrying N or O, both by themselves and in mixtures of two or more. In the case of a barrier layer of plastic, it is furthermore preferable for this to be as far as possible homogeneous and is therefore preferably obtainable from melts, such as are formed, for example, by extrusion, in particular laminating extrusion. In contrast, barrier layers of plastic which are obtainable by deposition from a solution or dispersion of plastics are preferred less since, in particular if deposition or formation takes place from a plastics dispersion, these often have at least partly particulate structures which show gas and moisture barrier properties which are poorer compared with the barrier layers of plastic which are obtainable from melts.

Possible suitable polymers on which the barrier layers of plastic can be based are, in particular, polyamide (PA) or polyethylene/vinyl alcohol (EVOH) or a mixture thereof.

All the PAs which appear to be suitable to the person skilled in the art for the production of and use in the containers according to the invention are possible as a PA. PA 6, PA 6.6, PA 6.10, PA 6.12, PA 11 or PA 12 or a mixture of at least two of these are to be mentioned here in particular, PA 6 and PA 6.6 being particularly preferred and PA 6 being further preferred. PA 6 is commercially obtainable under the trade names Akulon®, Durethan® and Ultramid®. Amorphous polyamides, such as e.g. MXD6, Grivory® and Selar®, are moreover suitable. The molecular weight of the PA should preferably be chosen such that the molecular weight range chosen on the one hand makes a good laminating extrusion possible in the production of the sheet-like composite for the container, and on the other hand the sheet-like composite itself has adequately good mechanical properties, such as a high elongation at break, a high abrasion resistance and an adequate rigidity for the container. This results in preferred molecular weights, determined as the weight-average via gel permeation chromatography (GPC) (according to ISO/DIS 16014-3:2003) with light scattering (according to ISO/DIS 16014-5:2003), in a range of from $3 \times 10^3$ to $1 \times 10^7$ g/mol, preferably in a range of from $5 \times 10^3$ to $1 \times 10^6$ g/mol and particularly preferably in a range of from $6 \times 10^3$ to $1 \times 10^5$ g/mol. Furthermore, in connection with the processing and mechanical properties, it is preferable for the PA to have a density (according to ISO 1183-1:2004) in a range of from 1.01 to 1.40 g/cm$^3$, preferably in a range of from 1.05 to 1.3 g/cm$^3$ and particularly preferably in a range of from 1.08 to 1.25 g/cm$^3$. It is furthermore preferable for the PA to have a viscosity number in a range of from 130 to 185 ml/g and preferably in a range of from 140 to 180 ml/g, determined in accordance with ISO 307 in 95% sulphuric acid.

All polymers which appear to be suitable to the person skilled in the art for the production and use of a container according to the invention can be employed as EVOH. Examples of suitable EVOHs are, inter alia, commercially obtainable in a large number of different configurations under the trade name EVAL™ from EVAL Europe NV, Belgium. The grades EVAL™ F104B, EVAL™ LR101B or EVAL™ LR171B appear to be particularly suitable.

Suitable EVOH grades are distinguished by at least one, particularly preferably by all of the following properties:
- an ethylene content in a range of from 20 to 60 mol %, preferably 25 to 45 mol %
- a density (according to ISO 1183-1:2004) in a range of from 1.0 to 1.4 g/cm$^3$, preferably between 1.1 to 1.3 g/cm$^3$
- a melting point (according to ISO 11357) in a range of from 115 to 235° C., preferably between 165 to 225° C.
- an MFR value (according to ISO 1133: 210° C./2.16 kg at a melting temperature of the EVOH of less than 230° C. and 230° C./2.16 kg at a melting temperature of the EVOH in a range of between 210 to 230° C.) in a range of from 1 to 20 g/10 min, preferably 2 to 15 g/10 min
- an oxygen permeation rate (according to ISO 14663-2 appendix C at 20° C. and 65% relative atmospheric humidity) in a range of from 0.05 to 3.2 cm$^3 \times$20 μm/m$^2 \times$day$\times$atm, preferably between 0.1 to 0.6 cm$^3 \times$20 mm/m$^2 \times$day$\times$atm.

In the case of a use of polyamide as the barrier layer of plastic, it is preferable for the polyamide layer to have a weight per unit area in a range of from 2 to 120 g/m$^2$, preferably in a range of from 3 to 75 g/m$^2$ and particularly preferably in a range of from 5 to 55 g/m$^2$. In this connection, it is furthermore preferable for the barrier layer of plastic to have a thickness in a range of from 2 to 90 μm, preferably a range of from 3 to 68 μm and particularly preferably in a range of from 4 to 50 μm.

Furthermore, in the case of EVOH as the barrier layer of plastic, at least one, preferably at least all of the parameters listed above for the polyamide with respect to the weight per unit area and the layer thickness are met.

However, the use of an aluminium foil which advantageously has a thickness in a range of from 3.5 to 20 μm, particularly preferably in a range of from 4 to 12 μm and very particularly preferably in a range of from 5 to 9 μm is preferred according to the invention as the barrier layer.

If an aluminium foil is employed as the barrier layer, it is furthermore preferable according to the invention for the aluminium foil to be bonded to the carrier layer via a laminating layer. In this case, with the laminating layer a further layer is thus provided between the barrier layer and the carrier layer.

Thermoplastics in particular, just as in the case of the polymer outer layer, are possible as the laminating layer, which conventionally has a layer thickness in a range of from 8 to 50 μm, particularly preferably in a range of from 10 to 40 μm and most preferably in a range of from 15 to 30 μm. Thermoplastics which are preferred in this connection are in turn those having a melting temperature in a range of from 80 to 155° C., preferably in a range of from 90 to 145° C., and particularly preferably in a range of from 95 to 135° C. Suitable thermoplastic polymer for the laminating layer are, in particular polyethylene or polypropylene, the use of polyethylene being particularly preferred. Here also, HDPE, MDPE, LDPE, LLDPE, PE or a mixture of at least two of these can be employed as the polyethylene. The MFR, determined by means of DIN 1133, of the polymers which can be employed for the laminating layer are preferably in a range of from 3 to 15 g/10 min, preferably in a range of from 3 to 9 g/10 min and particularly preferably in a range of from 3.5 to 8 g/10 min. In connection with the laminating layer, it is preferable to employ a thermoplastic polymer having a density (according to ISO 1183-1:2004) in a range of from 0.900 to 0.960 g/cm$^3$, preferably in a range of from 0.912 to 0.950 g/cm$^3$, an MFR in a range of from 2.5 to 8 g/10 min and a melting temperature (according to ISO 11357) in a range of from 96 to 135° C.

In the case of an aluminium foil as the barrier layer and the use of the laminating layer described above between the barrier layer and the carrier layer, an adhesion promoter layer can also be provided between the aluminium foil and the laminating layer, between the laminating layer and the carrier layer or between the laminating layer and the barrier layer and the laminating layer and the carrier layer.

Possible adhesion promoters are all polymers which, by means of suitable functional groups, are capable of generating a firm join by the formation of ionic bonds or covalent bonds to the surface of the other particular layer. Preferably, these are functionalized polyolefins which have been obtained by copolymerization of ethylene with acrylic acids, such as acrylic acid, methacrylic acid, crotonic acid, acrylates, acrylate derivatives or carboxylic acid anhydrides carrying double bonds, for example maleic anhydride, or at least two of these. Among these, polyethylene/maleic anhydride graft polymers are particularly preferred, these being marketed, for example, by DuPont under the trade name Bynel®.

According to a particular embodiment of the container according to the invention, however, an adhesion promoter layer is provided neither between the laminating layer preferably based on polyethylene and the aluminium foil nor between the laminating layer preferably based on polyethylene and the carrier layer, preferably the cardboard layer.

The adhesive layer following the barrier layer in the direction of the container interior, like the adhesion promoter layer described above, is preferably based on polymers which, by means of suitable functional groups, are capable of generating a firm join, particularly preferably a chemical bond, by the formation of ionic bonds or covalent bonds to the surface of the other particular layer, in particular to the surface of the aluminium foil. Preferably, these are functionalized polyolefins which have been obtained by copolymerization of ethylene with acrylic acid, acrylates, acrylate derivatives or carboxylic acid anhydrides carrying double bonds, for example maleic anhydride, or at least two of these. Of these, polyethylene/maleic anhydride graft polymers and ethylene/acrylic acid copolymers are particularly preferred, ethylene/acrylic acid copolymers being very particularly preferred. Such copolymers are marketed, for example, by DuPont under the trade name Nucrel® or by ExxonMobil Chemical under the trade name Escor®.

The polymer inner layer following the adhesive layer in the direction of the container interior, like the polymer outer layer described above, is based on thermoplastic polymers, it being possible for the polymer inner layer, like the polymer outer layer, to comprise a particulate inorganic solid. It is preferable, however, for the polymer inner layer to comprise a thermoplastic polymer to the extent of at least 70 wt. %, preferably at least 80 wt. % and particularly preferably at least 95 wt. %, in each case based on the polymer inner layer.

In this connection, it is particularly preferable for the polymer inner layer to comprise at least 70 wt. %, particularly preferably at least 75 wt. % and most preferably at least 80 wt. %, in each case based on the polymer inner layer, of a polyolefin prepared by means of a metallocene catalyst, preferably a polyethylene prepared by means of a metallocene catalyst (mPE).

It is particularly preferable according to the invention for the polymer inner layer to be a mixture of a polyolefin prepared by means of a metallocene catalyst and a further mixture polymer, the further mixture polymer preferably being a polyethylene which has not been prepared by means of a metallocene catalyst, preferably LDPE which has not been prepared by means of a metallocene catalyst. Preferably, the polymer inner layer is a mixture of 70 to 95 wt. %, particularly preferably 75 to 85 wt. % of mPE and 5 to 30 wt. %, particularly preferably 15 to 25 wt. % of LDPE.

Preferably, the polymer or the polymer mixture of the polymer inner layer has a density (according to ISO 1183-1:2004) in a range of from 0.900 to 0.930 g/cm$^3$, particularly preferably in a range of from 0.900 to 0.920 g/cm$^3$ and most preferably in a range of from 0.900 to 0.910 g/cm$^3$, while the MFR (ISO 1133, 190° C./2.16 kg) is preferably in a range of from 4 to 17 g/10 min, particularly preferably in a range of from 4.5 to 14 g/10 min and most preferably in a range of from 5 to 10 g/10 min.

According to a particularly preferred embodiment of the container according to the invention, the polymer inner layer follows the adhesive layer directly. Accordingly, no further layer, in particular no further layer based on polyethylene, very particularly preferably no further LDPE or HDPE layer, is provided between the polymer inner layer preferably comprising mPE and the adhesive layer.

The container according to the invention is now characterized in that the layer thickness of the adhesive layer $LT_{AL}$ is greater than the layer thickness of the polymer inner layer $LT_{PIL}$. In this context, it is particularly preferable for the layer thickness of the adhesive layer $LT_{AL}$ to be greater than the layer thickness of the polymer inner layer $LT_{PIL}$ by a factor in a range of from 1.1 to 5, still more preferably in a range of from 1.2 to 4 and most preferably in a range of from 1.3 to 3.5.

The total thickness of the adhesive layer and the polymer inner layer is often in the range of from 10 to 120 µm, preferably in a range of from 15 to 80 µm and particularly preferably in a range of from 18 to 60 µm. The preferred layer thicknesses of the individual two layers are deduced from the above factors.

Furthermore, in a particular embodiment of the container according to the invention at least the polymer inner layer or at least the adhesive layer or at least both of these layers comprise a polymer orientated by stretching, preferably a polymer orientated by monoaxial stretching. Such layers are obtainable, for example, by a procedure in which the layers which have been applied after extrusion and in which the thermoplastic polymer is still heated above the melting point are stretched in the monoaxial direction and then cooled to a temperature below the melting point for the purpose of thermofixing in the stretched state, in order to fix the orientation of the polymer chains in this way.

In order to facilitate the ease of opening of the container according to the invention, the carrier layer can have at least one hole which is covered at least with the barrier layer, the adhesive layer and the polymer inner layer as hole-covering layers.

According to a first particular embodiment of the container according to the invention, it is preferable for the carrier layer to have a hole which is covered at least with the polymer outer layer, the barrier layer, the adhesive layer and the polymer inner layer as hole-covering layers. Such an embodiment of a composite is described, for example, in EP-A-1 507 660 and EP-A1 507 661, but there a further layer, preferably based on LDPE, is provided between the polymer inner layer and the adhesive layer.

In connection with this first particular embodiment of the container according to the invention, the hole provided in the carrier layer can have any form which is known to the person skilled in the art and is suitable for various closures or drinking straws. The hole often has rounded edges in plan view. The hole can thus be essentially circular, oval, elliptical or tear-shaped. The shape of the hole in the carrier layer usually also predetermines the shape of the opening, which is generated in the container either by an openable closure joined to the container, through which the contents of the container are removed from the container after the opening, or by a drinking straw. The openings of the opened container therefore often have shapes which are comparable to or even the same as the hole in the carrier layer.

In connection with the covering of the hole of the carrier layer, in connection with the first particular embodiment of the container according to the invention it is preferable for the hole-covering layers to be joined to one another at least partly, preferably over to the extent of at least 30%, preferably at least 70% and particularly preferably to the extent of at least 90% of the area formed by the hole. It is furthermore preferable for the hole-covering layers to be joined to one another in the region of the hole edges surrounding the hole, and preferably to be joined adjacent to the hole edge, in order thus to achieve an improved tightness over a join extending over the entire hole area. The hole-covering layers are often joined to one another over the region formed by the hole in the carrier layer. This leads to a good tightness of the container formed from the composite and therefore to the desired high shelf life of the foodstuffs kept in the container.

The opening of the container is usually generated by at least partial destruction of the hole-covering layers covering the hole. This destruction can be effected by cutting, pressing into the container or pulling out of the container. The destruction can be effected by an openable closure joined to the container and arranged in the region of the hole, usually above the hole, or a drinking straw which is pushed through the hole-covering layers covering the hole.

According to a second particular embodiment of the container according to the invention, it is preferable for the carrier layer to have a plurality of holes in the form of a perforation, the individual holes being covered at least with the barrier layer, the adhesive layer and the polymer inner layer as hole-covering layers. The container can then be opened by tearing open along the perforation. In principle, the holes in the carrier layer, which preferably also all extend over the carrier layer in the direction of the layers lying to the surroundings (polymer outer layer and optionally printed layer), can have any shape which appears to be suitable to the person skilled in the art for configuration of a region to be opened in the container according to the invention. However, holes which are circular or elongated in plan view and preferably run along a line which forms a perforation in a container wall of the container according to the invention are preferred. Such perforations are preferably generated by means of a laser, which removes the layers formerly located in the hole. It is furthermore possible for the perforation to be constructed overall as a linear weakness in the sheet-like composite which, in the region of the weakness, has groups of sections having a smaller layer thickness compared to the weakness. These perforations are preferably obtained by mechanical perforation tools usually having blades. The result of this in particular is that the container according to the invention can be opened without excessive force or even the aid of a tool and with a lower risk of injury by tearing open the container wall of the container according to the invention along the perforation formed in this way.

Both in the first and in the second particular embodiment it can be envisaged that no polymer outer layer or printed layer is provided in the region of the hole(s) in the direction of the surroundings of the container. Rather, in this variant of the two embodiments it is preferable for the barrier layer to be in contact with the surroundings without a further layer of plastic, such as the polymer outer layer. This is preferably effected by nicking, cutting or stamping or a combination of at least two of these measures on the layers pointing from the barrier layer to the surroundings. It is preferable here for at least one of these measures to be carried out by a laser. The use of laser beams is particularly preferred if a metal foil or a metallized film is employed as the barrier layer. Perforations in particular for easy tearing open of the container can be generated in this way.

A contribution towards achieving the abovementioned objects is also made by a process for the production of a sheet-like composite, comprising as composite constituents:

a polymer outer layer which in the container produced from the sheet-like composite faces the surroundings;

a carrier layer following the polymer outer layer;

a barrier layer following the carrier layer;

an adhesive layer following the barrier layer;

a polymer inner layer following the adhesive layer;

wherein the layer thickness of the adhesive layer $LT_{AL}$ is greater than the layer thickness of the polymer inner layer $LT_{PIL}$;

comprising the process steps a. provision of a composite precursor containing at least the carrier layer;

b. application of the adhesive layer and the polymer inner layer by melt coating, preferably by extrusion coating.

In this context, those layers which have already been mentioned above as the preferred polymer outer layer, carrier layer, barrier layer, adhesive layer or polymer inner layer in connection with the container according to the invention are preferred as the polymer outer layer, carrier layer, barrier layer, adhesive layer and polymer inner layer. In connection with the composite precursor, it is preferable for this to have one or two and more scores along which edges are formed in the context of folding during production of the container. The scores can be provided in the composite precursor after or before coating of the carrier layer or in the sheet-like composite, it being preferable for the scores to be made after coating of the carrier layer, in the composite precursor, preferably sheet-like composite, obtained in this way. This leads to a better withstanding of mechanical stresses during folding.

In process step a. of the process according to the invention, a composite precursor containing at least the carrier layer is first produced. Preferably, this composite precursor is a laminate comprising the polymer outer layer, the carrier layer and the barrier layer. If the barrier layer is a metal foil, such as an aluminium foil, or a metallized film, the composite precursor also comprises the laminating layer described above. The composite precursor can also optionally comprise a printed layer applied to the polymer outer layer. If the carrier layer has one or more holes to facilitate the ease of opening, there are various production possibilities for the composite precursor according to the invention.

According to one process variant, a carrier layer which already contains the hole can be initially taken. The further layers, in particular the polymer outer layer and the barrier layer or the laminating layer, can then be laminated on to this carrier layer such that these layers at least partly but preferably completely cover the holes. In the region covering the hole, the polymer outer layer can then be laminated directly on to the barrier layer or the laminating layer, as is described, for example, in EP-A-1 570 660 or EP-A-1 570,661.

According to another procedure, the composite precursor can first be produced employing a carrier layer which does not yet contain holes and holes can then be introduced into the carrier layer by cutting, by laser treatment or by stamping, it being possible for this measure optionally also to be carried out only after process step b. For the production in particular of a perforation, it is preferable for the polymer outer layer, the carrier layer and the barrier layer, or in the case of the use of an aluminium foil the composite precursor comprising the polymer outer layer, the carrier layer, the laminating layer and the barrier layer, to be treated on the side of the polymer outer layer with a laser such that a plurality of holes which include the polymer outer layer and the carrier layer are formed in the form of a perforation.

In process step b. of the process according to the invention, the adhesive layer and the polymer inner layer are then applied by melt coating, preferably by extrusion coating, the adhesive layer being applied to the barrier layer and the polymer inner layer subsequently being applied to the adhesive layer. For this, the thermoplastic polymer forming the adhesive layer or the polymer inner layer is melted in an extruder and is applied in the molten state in the form of a flat coating to the composite precursor, it being ensured that the layer thickness of the adhesive layer $LT_{AL}$ is greater than the layer thickness of the polymer inner layer $LT_{PIL}$. The extrusion can be carried out in individual layers by a series of individual extruders following one another, or also in multiple layers by coextrusion.

According to a further embodiment, the melt coating can also be carried out by first joining the adhesive layer and the polymer inner layer to form a precursor layer and then applying this to the carrier layer. This application can be carried out on the one hand by superficial melting of the surface of the precursor layer or on the other hand by employing a further adhesion promoter, which is preferably in the form of a melt. The precursor layer can be effected by any process which appears to be suitable to the person skilled in the art for the production of thin two-fold and multiple layers, film blow moulding, in which stretching and therefore orientation can be established, being particularly preferred as the process. By this means, this precursor layer can be employed as roll goods, which can be produced independently of the production process for the composite according to the invention.

According to a particular embodiment of the process according to the invention for the production of a sheet-like composite, it is preferable, especially if the carrier layer, as described above, includes a hole or several holes, for at least the polymer inner layer or at least the adhesive layer or at least both layers to be stretched during the application, this stretching preferably being carried out by melt stretching, very particularly preferably by monoaxial melt stretching. For this, the corresponding layer is applied in the molten state to the composite precursor by means of a melt extruder and the layer applied, which is still in the molten state, is then stretched in preferably the monoaxial direction in order to achieve an orientation of the polymer in this direction. The layer applied is then allowed to cool for the purpose of thermofixing. If both the adhesive layer and the polymer inner layer are stretched, this operation can be correspondingly repeated twice, first with the adhesive layer and then with the polymer inner layer. In another embodiment, this can be carried out by coextrusion of two and more layers simultaneously.

In this connection, it is particularly preferable for the stretching to be carried out by at least the following application steps:
b1. emergence at least of the polymer inner layer or at least of the adhesive layer or at least of both layers as at least one melt film via at least one extruder slot with an exit speed $V_{exit}$;
b2. application of the at least one melt film to the composite precursor moving relative to the at least one extruder slot with a moving speed $V_{adv}$;
where $V_{exit} < V_{adv}$. It is particularly preferable for $V_{adv}$ to be greater than $V_{exit}$ by a factor in the range of from 5 to 200, particularly preferably in a range of from 7 to 150, moreover preferably in a range of from 10 to 50 and most preferably in a range of from 15 to 35. In this context, it is preferable for $V_{adv}$ to be at least 100 m/min, particularly preferably at least 200 m/min and very particularly preferably at least 350 m/min, but conventionally not to lie above 1,300 m/min.

According to the invention, the stretching of the adhesive layer, of the polymer inner layer or of these two layers is accordingly achieved by a procedure in which the composite precursor on to which these layers are applied by melt extrusion is moved away from the extruder at a speed, relative to the exit speed of the melt from the extruder, which is greater than the exit speed of the melt, as a result of which stretching of the melt film occurs.

The slot width in the melt extruder in this context is preferably in a range of from 0.2 to 1.5 mm, particularly preferably in a range of from 0.4 to 1.0 mm, so that the exit thickness of the melt on leaving the extruder slot is preferably in a range of from 0.2 to 1.5 mm, particularly preferably in a range of from 0.4 to 1.0 mm, while the thickness of the melt layer (adhesive layer or polymer inner layer) applied to the composite precursor is in a range of from 5 to 100 µm, particularly preferably in a range of from 7 to 50 µm. By the stretching, a significant reduction in the layer thickness of the melt layer thus occurs from the region of exit from the melt extruder to the melt layer in contact on the composite precursor due to application.

In this connection it is furthermore preferable for the melt to have a temperature in a range of from 200 to 360° C., particularly preferably in a range of from 250 to 320° C., on exit from the melt extruder.

It is furthermore preferable for the stretching on a carrier layer formed from fibres, for example paper or cardboard, to be carried out in the direction of the fibre direction. In the present case, the fibre direction is understood as meaning the direction in which the carrier layer has the lowest flexural strength. This is often the so-called machine direction, in which the carrier layer, if this is paper or cardboard, is produced. This measure can lead to improved opening properties.

After the melt layer has been applied to the composite precursor by means of the stretching process described above, the melt layer is allowed to cool for the purpose of thermofixing, this cooling preferably being carried out by quenching via contact with a surface which is kept at a temperature in a range of from 5 to 50° C., particularly preferably in a range of from 10 to 30° C. The duration of this bringing into contact of the composite precursor covered with the melt film with the temperature-controlled surface is preferably in a range of from 2 to 0.15 ms, particularly preferably in a range of from 1 to 0.2 ms.

After the thermofixing it may furthermore prove to be particularly advantageous if the sheet-like composite is subjected to heat treatment at least in the region of the at least one hole, in order to effect there an at least partial elimination of the orientation of the polymer in the adhesive layer, in the polymer inner layer or in both layers. This heat treatment has the effect of an improved ease of opening of the container. In the case of several holes present in the carrier layer in the form of a perforation, it is particularly preferable for this heat treatment to be carried out around the edge region of the hole.

The heat treatment can be carried out by electromagnetic radiation, by treatment with hot gas, by thermal contact with a solid, by ultrasound or by a combination of at least two of these measures. The heat treatment is particularly preferably carried out by electromagnetic induction. In connection with the treatment by electromagnetic radiation, in particular by electromagnetic induction, it is preferable for at least one, preferably each of the following operating parameters to be realized:
i. starting voltage in a range of from 30 to 120 $V_{eff}$ and preferably in a range of from 45 to 90 $V_{eff}$;
ii. starting current in a range of from 10 to 70 A and preferably in a range of from 25 to 50 A;
iii. starting power in a range of from 0.5 to 10 kW and preferably in a range of from 1 to 5 kW;

iv. starting frequency in a range of from 10 to 1,000 kHz and preferably in a range of from 50 to 500 kHz.

These operating conditions are achieved, for example, by an induction generator and oscillator of the "i-class" type from Cobes GmbH, Germany. A linear inductor is furthermore preferably employed according to the invention for the treatment. The area to be treated on the sheet-like composite is moved past this, this preferably being carried out with speeds of at least 50 m/min, but usually not more than 500 m/min. Speeds in a range of from 100 to 300 m/min are often achieved.

In the case of irradiation, any type of radiation which is suitable to the person skilled in the art for softening the plastics is possible. Preferred types of radiation are IR rays, UV rays and microwaves. Preferred types of vibration are ultrasound. In the case of IR rays, which are also employed for IR welding of sheet-like composites, wavelength ranges of from 0.7 to 5 µm are to be mentioned. Laser beams in a wavelength range of from 0.6 to less than 10.6 µm can furthermore be employed. In connection with the use of IR rays, these are generated by various suitable lamps which are known to the person skilled in the art. Short wavelength lamps in the range of from 1 to 1.6 µm are preferably halogen lamps. Medium wavelength lamps in the range of from >1.6 to 3.5 µm are, for example, metal foil lamps. Quartz lamps are often employed as long wavelength lamps in the range of >3.5 µm. Lasers are ever more often employed. Thus, diode lasers are employed in a wavelength range of from 0.8 to 1 µm, Nd:YAG lasers at about 1 µm and $CO_2$ lasers at about 10.6 µm. High frequency techniques with a frequency range of from 10 to 45 MHz, often in a power range of from 0.1 to 100 kW, are also employed.

In the case of ultrasound, the following treatment parameters are preferred:

P1 a frequency in a range of from 5 to 100 kHz, preferably in a range of from 10 to 50 kHz and particularly preferably in a range of from 15 to 40 kHz;

P2 an amplitude in the range of from 2 to 100 µm, preferably in a range of from 5 to 70 µm and particularly preferably in a range of from 10 to 50 µm;

P3 a vibration time (as the period of time in which a vibrating body, such as a sonotrode, acts in contact vibration on the sheet-like composite) in a range of from 50 to 1,000 msec, preferably in a range of from 100 to 600 msec and particularly preferably in a range of from 150 to 300 msec.

For a suitable choice of the radiation or vibration conditions, it is advantageous to take into account the intrinsic resonances of the plastics and to choose frequencies close to these.

The further processing of the sheet-like composite to give a container is described here by way of example for the process which proceeds via a jacket. However, it is entirely possible also to create the container according to the invention via other processes. Thus, for example, a tube can be formed from roll goods by folding. This can be carried out, for example, on a device described in WO 2010/023859 in FIG. 3.

Heating via contact with a solid can be effected, for example, by a heating plate or heating mould which is in direct contact with the sheet-like composite and releases the heat to the sheet-like composite. Hot air can be directed on to the sheet-like composite by suitable fans, outlets or nozzles or a combination thereof. Contact heating and hot gas are often employed simultaneously. Thus, for example, a holding device which holds a jacket formed from the sheet-like composite and through which hot gas flows, and which is thereby heated up and releases the hot gas through suitable openings, can heat the sheet-like composite by contact with the wall of the holding device and the hot gas. Furthermore, the jacket can also be heated by fixing the jacket with a jacket holder and directing a flow from one or two and more hot gas nozzles provided in the jacket holder on to the regions of the jacket to be heated.

Preferably, the adhesive layer or the polymer inner layer is heated to a surface temperature in a range of from 70 to 260° C., particularly preferably in a range of from 80 to 220° C., by the heat treatment described above in order to at least partly reduce the orientation of the polymers in this layer or in these two layers. The surface temperature is determined by employing an IR measuring device of the type of LAND Cyclops T135+ thermal imaging camera, scanning system with 8-sided polygonal mirror, 25 Hz at a measurement angle to the flat-lying sample of 45° (adjustable via a tripod) at a distance from the lens ring to the polymer inner layer of 240 mm and an emission factor of 1. Preferably, the surface temperature is generated by hot air having a temperature in the range of from 200 to 500° C. and particularly preferably in a range of from 250 to 400° C., in each case over a treatment period in a range of from 0.1 to 5 sec and particularly preferably in a range of from 0.5 to 3 sec. This is particularly preferred for the treatment of hole regions.

In a further embodiment of the process according to the invention, it is preferable for the heat treatment to be carried out by electromagnetic induction. It is preferable here for the inductor to be provided on the surface of the sheet-like composite which, in the container formed therefrom, faces the surroundings. In connection with the treatment by electromagnetic radiation, in particular by electromagnetic induction, it is preferable for at least one, preferably each of the following operating parameters to be realized:

i. starting voltage in a range of from 30 to 120 $V_{eff}$ and preferably in a range of from 45 to 90 $V_{eff}$;

ii. starting current in a range of from 10 to 70 A and preferably in a range of from 25 to 50 A;

iii. starting power in a range of from 0.5 to 10 kW and preferably in a range of from 1 to 5 kW;

iv. starting frequency in a range of from 10 to 1,000 kHz and preferably in a range of from 50 to 500 kHz;

v. distance between inductor surface and composite surface in a range of from 0.3 to 3 mm and preferably in a range of from 0.5 to 2 mm.

In the process according to the invention, it is furthermore preferable for the maximum transmission intensity of at least one of the hole-covering layers comprising a stretched polymer to differ before and after the heat treatment. This can conventionally be ascertained by different representations of the region viewed through a polarization filter. The heat-treated regions thus differ by light-dark contrasts from the regions on a surface which are adjacent to these but have not been heat-treated. The same applies to regions before and after the heat treatment. In this connection, it is further preferable for the at least one hole-covering layer to be the polymer inner layer. It is moreover preferable for the barrier layer to be a metal foil or a metallized layer of plastic. The polymer layer heat-treated in regions, usually the polymer inner layer of the container formed later, is provided over this, so that the barrier layer shows through. Moreover, a difference in gloss is generally to be detected due to the change in structure of the polymer inner layer originating from the heat treatment, compared with that which has not been heat-treated. The regions of different gloss coincide with the heat-treated regions of the surface of the polymer inner layer.

In addition to the hole-covering layers, still further regions of the sheet-like composite can also be subjected to heat treatment. These also show a different maximum transmission intensity compared with the non-treated regions. These include all regions in which joining by sealing is carried out and/or scores for folding are provided. Among these regions, the longitudinal seams at which the sheet-like composite is formed into a tubular or jacket-like structure are particularly preferred. After the above heat treatment, the heat-treated regions can be allowed to cool again.

A contribution towards achieving the abovementioned objects is also made by a process for the production of a container, comprising the process steps:

A1. provision of a sheet-like composite obtainable by the process described above for the production of a sheet-like composite;

A2. folding of the sheet-like composite to obtain the container;

A3. closing of the container.

In process step A1. of the process according to the invention, a sheet-like composite obtained by the process described above for the production of a sheet-like composite is first provided, from which a container is then formed by folding in process step A2. According to the invention, in this context "folding" is understood as meaning an operation in which preferably an elongated kink forming an angle is generated in the folded sheet-like composite by means of a folding edge of a folding tool. For this, two adjacent surfaces of a sheet-like composite are often bent ever more towards one another. By the fold, at least two adjacent fold surfaces are formed, which are then joined at least in part regions to form a container region. According to the invention, the joining can be effected by any measure which appears to be suitable to the person skilled in the art and which renders possible a join which is as gas- and liquid-tight as possible. The joining can be carried out by sealing or gluing or a combination of the two measures. In the case of sealing, the join is created by means of a liquid and solidification thereof. In the case of gluing, chemical bonds which create the join form between the boundary faces or surfaces of the two objects to be joined. In the case of sealing or gluing, it is often advantageous for the surfaces to be sealed or glued to be pressed together with one another.

The sealing temperature is preferably chosen such that the plastic(s) involved in the sealing, preferably the polymers of the polymer outer layer and/or of the polymer inner layer, are present as a melt. Furthermore, the sealing temperature chosen should not be too high, in order that the exposure of the plastic(s) to heat is not unnecessarily severe, so that these do not lose their envisaged material properties. The sealing temperatures are conventionally at least 1 K, preferably at least 5 K and particularly preferably at least 10 K above the melting temperature of the particular plastic.

A foodstuff can be enclosed by the sheet-like composite even before a container has been obtained in process step A2. in the manner described above or after this container has been obtained in process step A2. All the foodstuffs known to the person skilled in the art for human consumption and also animal feeds are possible as the foodstuff. Preferred foodstuffs are liquid above 5° C., for example drinks. Preferred foodstuffs are dairy products, soups, sauces, non-carbonated drinks, such as fruit drinks and juices or teas. The foodstuffs can on the one hand be sterilized beforehand and filled into containers which have likewise been sterilized beforehand, or enclosed in a sheet-like composite which has likewise been sterilized beforehand. The foodstuffs can furthermore be sterilized after filling or enclosing. This is carried out, for example, by autoclaving. Fat-containing foodstuffs are preferred in particular as the foodstuff. Fat-containing foodstuffs often have a fat content, determined in the dry matter of the fat on the foodstuff, of at least 10 wt. %, preferably at least 30 wt. %, preferably at least 40 wt. %, furthermore preferably at least 50 wt. % and particularly preferably at least 60 wt. %. By this means, a container with this fat-containing foodstuff in which this can be stored particularly well without spoiling over a long time is obtainable.

In the embodiment of the process according to the invention for the production of a container in which the foodstuff is already enclosed by the sheet-like composite before process step A2., it is preferable for a tubular structure with a fixed longitudinal seam first to be formed from the sheet-like composite by folding and sealing or gluing the overlapping borders. This tubular structure is compressed laterally, fixed and separated and formed into an open container by folding and sealing or gluing. The foodstuff here can already be filled into the container after the fixing and before the separation and folding of the base.

In the embodiment of the process according to the invention in which the container is filled with foodstuff after step A2., it is preferable for a container which is obtained by folding the sheet-like composite and is closed in the region of the base and opened in the region of the top to be employed. The shaping of the sheet-like composite and the obtaining of such an opened container can be carried out by any operating procedure which appears to be suitable for this to the person skilled in the art. In particular, the shaping can be carried out by a procedure in which the sheet-like container preform which in its blank already takes into account the shape of the container is folded such that a container opened via a jacket is formed. This is as a rule effected by a procedure in which after folding of this container preform, its longitudinal edge is sealed or glued to form a side wall and the one side of the jacket is closed by folding and further fixing, in particular sealing or gluing.

The filling with foodstuff can be carried out in various ways. On the one hand, the foodstuff and the container can be sterilized separately, before the filling, to the greatest degree possible by suitable measures such as treatment of the container with $H_2O_2$ or UV radiation or other suitable high-energy radiation or plasma treatment or a combination of at least two of these and heating of the foodstuff. This type of filling is often called "aseptic filling" and is preferred according to the invention. In addition to or also instead of the aseptic filling, it is furthermore a widespread procedure to heat the container filled with foodstuff to reduce the germ count. This is preferably carried out by autoclaving. Less sterile foodstuffs and containers can also be employed in this procedure.

According to a particular embodiment of the process according to the invention for the production of a container, after joining of the composite constituents to form the container this is subjected to no further treatment with a flame or a plasma.

Test Methods

Unless specified otherwise herein, the parameters mentioned herein are measured by means of DIN specifications.

The maximum transmission intensity is determined by laying an IFK-P-W76 polarization filter film from Schneider Optik GmbH on an area to be tested. The film is rotated on the area to be tested until the differences in the maximum transmission intensity are detectable with the maximum light-dark contrast.

FIGURES

The present invention is now explained in more detail by drawings given by way of example which do not limit this, the figures showing 1 a diagram of a container according to the invention,
2 a diagram of the sheet-like composite employed for the production of this container,
3 a diagram of a preferred embodiment of the sheet-like composite employed for the production of this container,
4 a diagram of a container according to the invention having a plurality of holes in the carrier layer in the form of a perforation,
5 a diagram of a container according to the invention having a hole in the carrier layer which can be provided with an openable closure,
6 a diagram of a hole covered with hole-covering layers and having an openable closure with opening means as parts of a closure system,
7 a diagram of the process according to the invention relating to application of the adhesive layer and/or the polymer inner layer, and
8 a diagram of the heat treatment by means of an inductor.

FIG. 1 shows a container 3 surrounding an interior 1 and made of a sheet-like composite 4, which separates a foodstuff enclosed therein from the surroundings 2.

Figure 2:
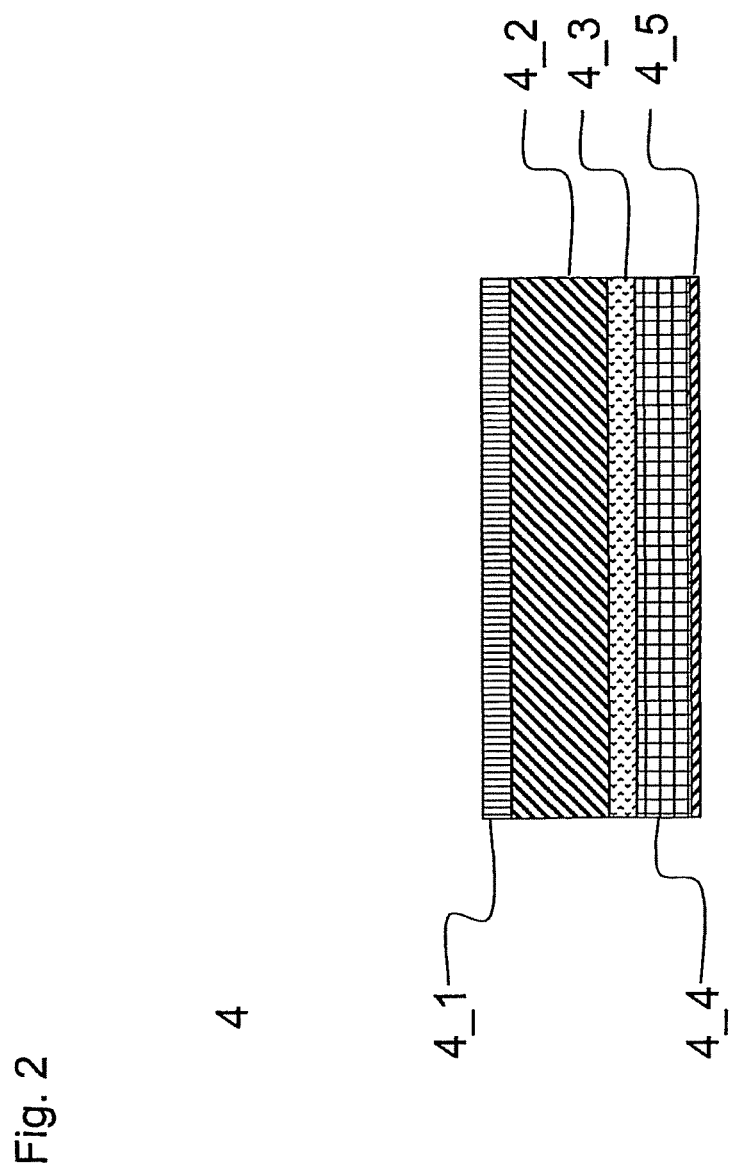

FIG. 2 shows the layered structure of the sheet-like composite 4 from which the container 3 can be produced by folding. The composite 4 comprises at least one polymer outer layer 4_1, which faces the surroundings 2 after formation of the container 3. The polymer outer layer 4_1, which is preferably formed from a thermoplastic polymer, such as polyethylene or polypropylene, is followed by a carrier layer 4_2 which is preferably based on paper or cardboard and which in turn is followed by a barrier layer 4_3. The barrier layer 4_3 is followed by the adhesive layer 4_4, which finally is followed by the polymer inner layer 4_5. In the container 3, this polymer inner layer 4_5 is in direct contact with the foodstuff.

Figure 3:
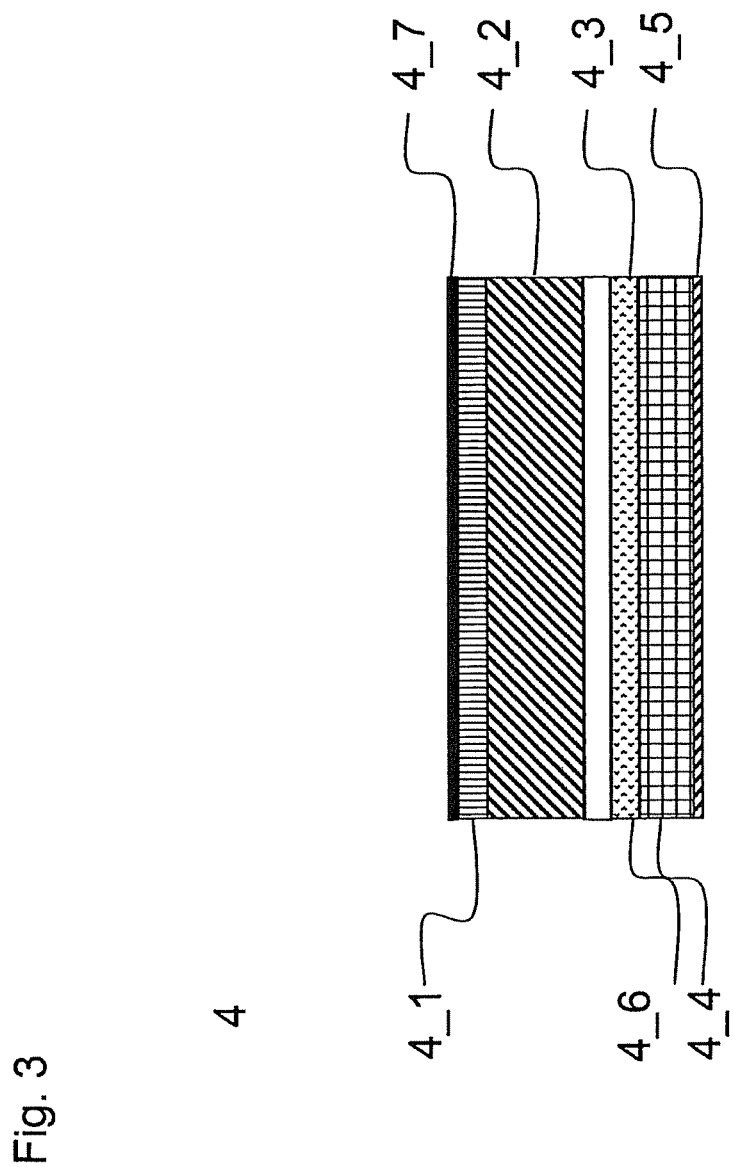

FIG. 3 shows the preferred layered structure of the sheet-like composite 4 from which the container 3 can be produced by folding. The composite 4 also comprises, in addition to the layers shown in FIG. 2, a printed layer 4_7 applied to the polymer outer layer 4_1 and a laminating layer 4_6 provided between the carrier layer 4_2 and the barrier layer 4_3. This laminating layer 4_6, which is preferably based on thermoplastic polymers, such as polyethylene or polypropylene, is provided in particular if a metal foil, such as, for example, aluminium foil, is employed as the barrier layer 4_3.

Figure 4:
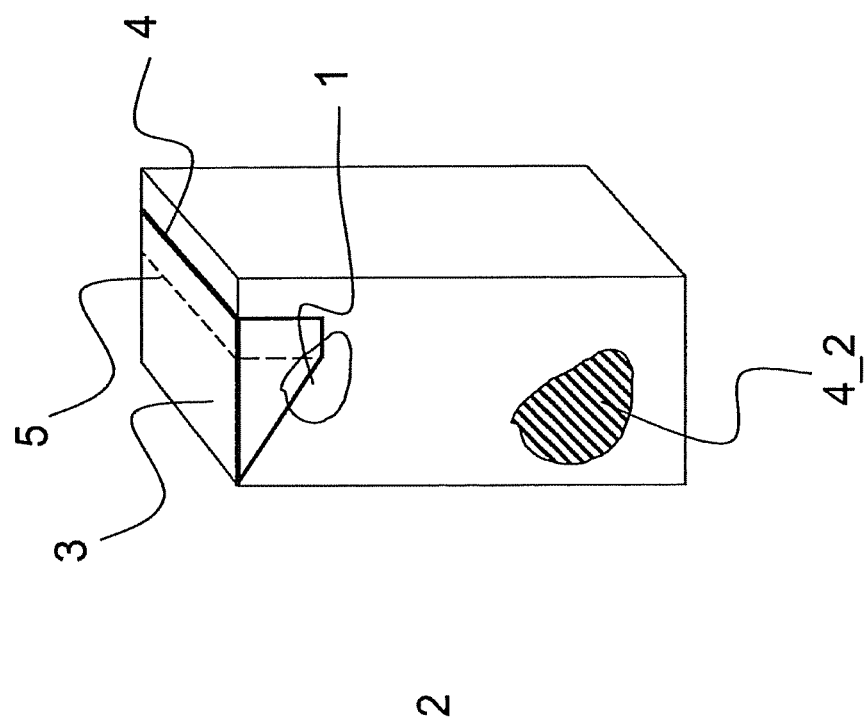

FIG. 4 shows a first particular embodiment of the container 3 according to the invention, in which, in contrast to the container 3 shown in FIG. 1, a plurality of holes are provided on the upper side of the container 3 along a line 5, which form a perforation for easy opening of the container 3.

Figure 5:
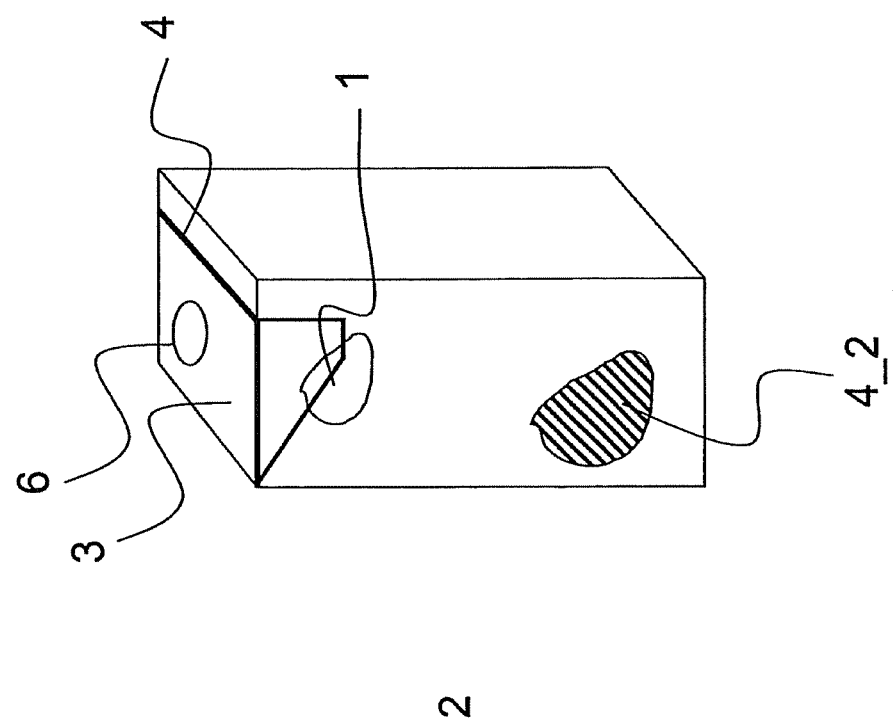

FIG. 5 shows a second particular embodiment of the container 3 according to the invention, in which in contrast to the container 3 shown in FIG. 1, a covered hole 6 over which an openable closure (not shown) can be provided is provided in the top region.

Figure 6:
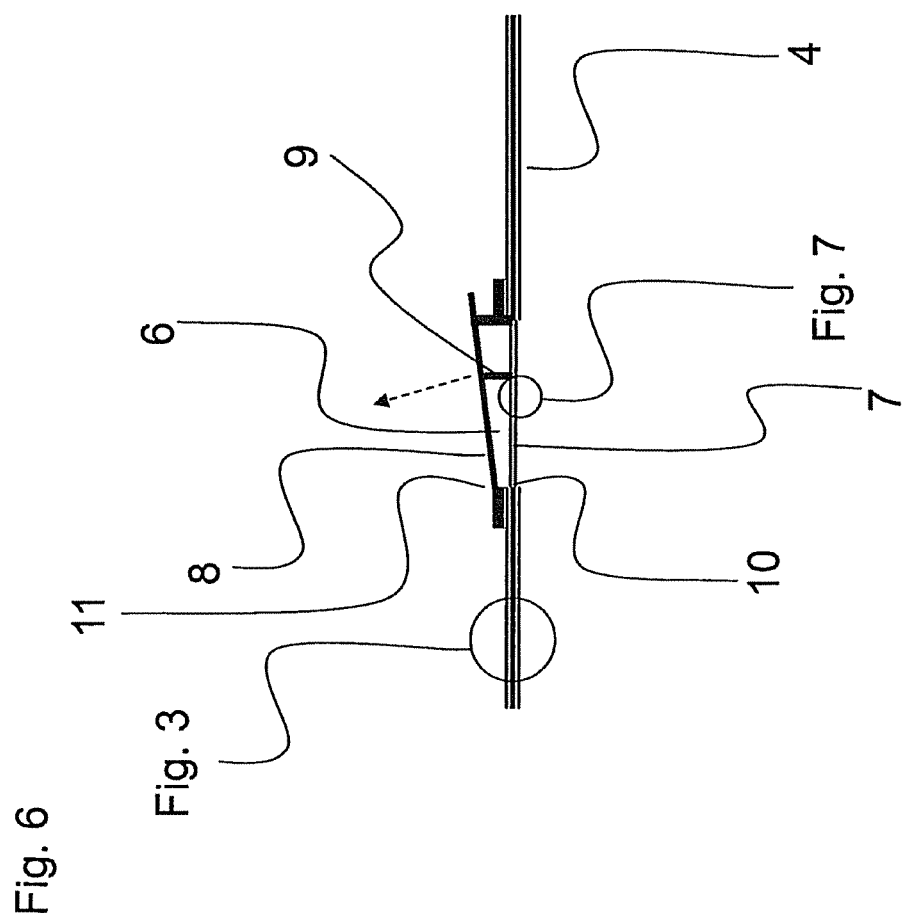

FIG. 6 shows a diagram of the cross-section of a section of the top region of a container 3 according to the invention. A sheet-like composite 4 with the details of the layered structure shown in FIG. 3 has a hole 6 which is delimited via a hole edge 10. In the hole 6 are hole-covering layers 7 which comprise at least the barrier layer 4_3, the adhesive layer 4_4 and the polymer inner layer 4_5. Due to the absence of the carrier layer 4_2 in the region of the hole 6, the hole-covering layers 7 surround, along the hole edge 10 in a moisture-tight manner, the carrier layer 4_2 extending to the hole edge 10, and cover the hole 6, so that the container 3 is closed off in a manner which is as liquid- and gas-tight as possible. On the outside of the container 3 an openable closure 8 covering the hole 6 is provided. The closure 8 has an opening means 9, which is joined to the hole-covering layers 7 and can be swiveled via a joint 11 in the direction of the broken arrow. When the opening means 9 is swiveled in the direction of the arrow, the hole-covering layers 7 are torn open and the closed container 3 is opened in this way.

Figure 7:
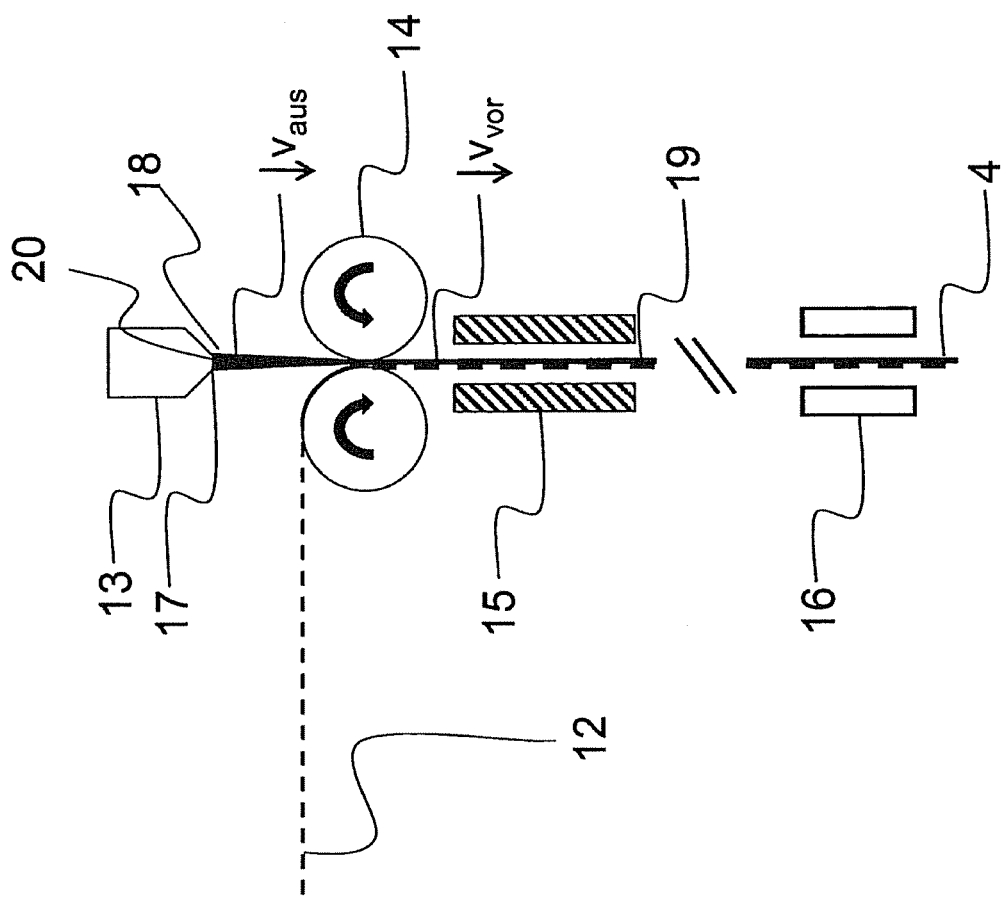

FIG. 7 shows a diagram of the process according to the invention relating to application of the adhesive layer and/or the polymer inner layer. A composite precursor is driven by a roll pair 14 continuously between this roll pair 14 and is thus continuously passed under a melt extruder 13. From the melt extruder 13, a melt of that thermoplastic polymer from which the adhesive layer 4_4 or the polymer inner layer 4_5 is formed is discharged with the exit speed $V_{exit}$ from the extruder slot with an exit thickness 18 determined by the slot width 17. It arrives at the surface of the composite precursor 12. If the melt is the adhesive layer 4_4, this is applied to the side of the barrier layer 4_3 of the composite precursor 12 facing away from the carrier layer 4_2, with a layer thickness 19. If the melt is the polymer inner layer 4_5, this is applied to the adhesive layer 4_4. As a result of the composite precursor 12 being moved relative to the extruder slot at a speed $V_{adv}$ which is greater than $V_{exit}$, during application of the adhesive layer 4_4 or the polymer inner layer 4_5 a stretching of the melt layer in the monoaxial direction and consequently a monoaxial orientation of the polymer chains in this layer occur. FIG. 7 also shows that by the stretching, a significant reduction in the layer thickness of the melt layer occurs from the region of exit from the melt extruder to the melt layer applied to the composite precursor.

After the adhesive layer or the polymer inner layer has been applied in the manner described above in the monoaxially stretched form as a melt layer, the composite obtained in this way can be cooled for the purpose of thermofixing of the stretched melt layer, for example by contact with a temperature-controlled surface 15 often configured as cooling rolls.

If both the adhesive layer 4_4 and the polymer inner layer 4_5 are to be applied as a stretched melt layer by the process described above, the process described above is carried out first with the adhesive layer 4_4 and then with the polymer inner layer 4_5.

In order at least to reduce the orientation of the polymer chains in the adhesive layer 4_4 and/or the polymer inner layer 4_5 at least in the regions of the hole-covering layers 7 spanning the hole or the holes in the sheet-like composite 4, the composite can also be heated by means of suitable heating devices 16, in particular in the hole regions.

FIG. 8 shows a sheet-like composite 4 which has, for example, the structure shown in FIGS. 2 and 3. In the region of the hole 6 closed with the hole-covering layers 7 which is surrounded by the hole edge 10, an inductor 22 is provided, which heats the hole-covering layers 7 and an edge region of the sheet-like composite 4 around the hole edges 10 by electromagnetic induction via a high frequency generator 23.

LIST OF REFERENCE SYMBOLS

1 Interior
2 Surroundings

3 Container
4 Sheet-like composite
4_1 Polymer outer layer
4_2 Carrier layer
4_3 Barrier layer
4_4 Adhesive layer
4_5 Polymer inner layer
4_6 Laminating layer
4_7 Printed layer
5 Perforation
6 Hole
7 Hole-covering layers
8 Closure
9 Opening means
10 Hole edge
11 Joint
12 Composite precursor
13 Melt extruder
14 Roll pair
15 Cooling surface
16 Heating device
17 Slot width
18 Exit thickness
19 Layer thickness
20 Extruder slot
21 Heat-treated region
22 Inductor
23 High frequency generator

The invention claimed is:

1. A container that delimits a container interior from the surroundings and that is formed at least in part from a sheet-like composite, wherein the sheet-like composite comprises:
a polymer outer layer facing the surroundings;
a carrier layer following the polymer outer layer in the direction of the container interior;
a barrier layer following the carrier layer in the direction of the container interior;
an adhesive layer following the barrier layer in the direction of the container interior;
a polymer inner layer following the adhesive layer in the direction of the container interior;
wherein the adhesive layer comprises an ethylene/acrylic acid copolymer;
wherein the polymer inner layer comprises a mixture of 70 to 95 wt. % of an mPE and 5 to 30 wt. % of an LDPE; and
wherein the layer thickness of the adhesive layer $LT_{AL}$ is greater than the layer thickness of the polymer inner layer $LT_{PIL}$.

2. The container according to claim 1, wherein the layer thickness of the adhesive layer is greater than the sum of all the layer thicknesses of the composite layers lying between the adhesive layer and container interior.

3. The container according to claim 1, wherein at least the polymer inner layer, at least the adhesive layer, or at least both comprise an orientated polymer.

4. The container according to claim 1, wherein $LT_{AL}$ is at least 1.1 times greater than $LT_{PIL}$.

5. The container according to claim 1, wherein the adhesive layer forms chemical bonds with the barrier layer.

6. The container according to claim 1, wherein the carrier layer is made of paper or cardboard.

7. The container according to claim 1, wherein the carrier layer has a hole which is covered at least with the barrier layer, the adhesive layer and the polymer inner layer as hole-covering layers.

8. The container according to claim 1, wherein the carrier layer is made of paper or cardboard.

9. A process for the production of a sheet-like composite comprising:
a polymer outer layer;
a carrier layer following the polymer outer layer;
a barrier layer following the carrier layer;
an adhesive layer following the barrier layer; and
a polymer inner layer following the adhesive layer;
wherein the adhesive layer comprises an ethylene/acrylic acid copolymer;
wherein the polymer inner layer comprises a mixture of 70 to 95 wt. % of an mPE and 5 to 30 wt. % of an LDPE;
wherein the layer thickness of the adhesive layer $LT_{AL}$ is greater than the layer thickness of the polymer inner layer $LT_{PIL}$;
comprising the process steps of:
providing a composite precursor containing at least the carrier layer; and
applying the adhesive layer and the polymer inner layer by melt coating.

10. The process according to claim 9, wherein at least the polymer inner layer, at least the adhesive layer, or at least both are stretched during the application.

11. The process according to claim 10, wherein the stretching is a melt stretching.

12. The process according to claim 10, wherein the stretching comprises:
emergence at least of the polymer inner layer, at least of the adhesive layer, or at least both as at least one melt film via at least one extruder slot with an exit speed $V_{exit}$; and
application of the at least one melt film to the composite precursor moving relative to the at least one extruder slot with a moving speed $V_{adv}$; wherein $V_{exit} < V_{adv}$.

13. The process according to claim 12, wherein $V_{adv}$ is greater than $V_{exit}$ by a factor in the range of from 5 to 200.

14. The process according to claim 9, wherein the sheet-like composite is subjected to heat treatment at least in the region of the at least one hole.

15. The process according to claim 14, wherein the heat treatment is carried out electromagnetically, by a hot gas, by a thermal contact with a solid, by ultrasound, or a combination thereof.

16. The process according to claim 14, wherein the heat treatment is carried out by electromagnetic induction.

17. A process for producing a container, comprising:
providing a sheet-like composite obtained by the process according to claim 9;
folding the sheet-like composite to obtain the container; and
closing the container.

18. The process according to claim 17, wherein the hole is provided with a closure that perforates the hole-covering layers during opening.

19. The process according to claim 17, wherein the container is filled with a foodstuff before the closing step.

20. The container according to claim 1, wherein the barrier layer is an aluminium foil that is bonded to the carrier layer via a laminating layer.

21. The process according to claim 9, wherein the barrier layer is an aluminium foil that is bonded to the carrier layer via a laminating layer.

22. The process according to claim 9, wherein the carrier layer has a hole which is covered at least with the barrier layer, the adhesive layer, and the polymer inner layer as hole-covering layers.

* * * * *